(12) United States Patent
Lee (10) Patent No.: US 9,595,197 B2
(45) Date of Patent: Mar. 14, 2017

(54) LATERAL CONTROL APPARATUS OF VEHICLE AND CONTROL METHOD OF THE SAME

(71) Applicant: HYUNDAI MOBIS CO., LTD., Seoul (KR)

(72) Inventor: Jun Han Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 5 days.

(21) Appl. No.: 14/677,377

(22) Filed: Apr. 2, 2015

(65) Prior Publication Data

US 2015/0213719 A1 Jul. 30, 2015

Related U.S. Application Data

(63) Continuation of application No. 13/847,008, filed on Mar. 19, 2013, now Pat. No. 9,037,373.

(30) Foreign Application Priority Data

Dec. 28, 2012 (KR) .......................... 10-2012-0155703

(51) Int. Cl.
   *G08G 1/16* (2006.01)
   *G01C 21/34* (2006.01)
   *G01B 21/16* (2006.01)

(52) U.S. Cl.
   CPC .............. *G08G 1/167* (2013.01); *G01B 21/16* (2013.01); *G01C 21/34* (2013.01)

(58) Field of Classification Search
   CPC ......... G08G 1/167; G01C 21/34; G01B 21/16
   See application file for complete search history.

(56) References Cited

U.S. PATENT DOCUMENTS

| 5,642,093 A | 6/1997 | Kinoshita et al. |
| 6,230,093 B1 | 5/2001 | Michi et al. |
| (Continued) | | |

FOREIGN PATENT DOCUMENTS

| JP | 2000-25631 A | 1/2000 |
| JP | 2005-56025 A | 3/2005 |
| (Continued) | | |

OTHER PUBLICATIONS

Korean Office Action Issued on Mar. 19, 2014, in counterpart Korean Application No. 10-2012-0155703 (5 pages, in Korean).

*Primary Examiner* — Mussa A Shaawat
*Assistant Examiner* — Kelly D Williams
(74) *Attorney, Agent, or Firm* — NSIP Law (57) ABSTRACT

The present invention provides a lateral control apparatus including: an offset measuring unit that measures current lateral offsets of at least two other vehicles at a current time based on a center of a driving lane; a preview offset calculating unit that predicts a lateral offset of the other vehicle based on the center of the driving lane based on a location and a speed of the other vehicle at a time when a predetermined time has elapsed to calculate a preview offset; a priority determining unit that determines a priority of the other vehicles based on a difference between the lateral offset and the preview offset; and a controller that generates a route for lane keeping control of own vehicle based on the lateral offset of the other vehicle to which a top priority is assigned by the priority determining unit.

15 Claims, 6 Drawing Sheets

(56) References Cited

U.S. PATENT DOCUMENTS

| | | | |
|---|---|---|---|
| 6,571,176 B1* | 5/2003 | Shinmura | B60T 7/22 180/421 |
| 6,653,935 B1 | 11/2003 | Winner et al. | |
| 7,046,171 B2 | 5/2006 | Yanai | |
| 7,640,108 B2 | 12/2009 | Shimizu et al. | |
| 8,473,144 B1 | 6/2013 | Dolgov et al. | |
| 8,494,716 B1 | 7/2013 | Lee et al. | |
| 8,600,657 B2 | 12/2013 | Saito et al. | |
| 2003/0062769 A1 | 4/2003 | Matsumoto et al. | |
| 2005/0228588 A1* | 10/2005 | Braeuchle | B60W 30/095 701/301 |
| 2006/0047388 A1 | 3/2006 | Oka et al. | |
| 2006/0095193 A1* | 5/2006 | Nishira | B60T 7/22 701/96 |
| 2010/0228420 A1 | 9/2010 | Lee | |
| 2011/0093177 A1* | 4/2011 | Horn | B60W 30/16 701/70 |

FOREIGN PATENT DOCUMENTS

| | | |
|---|---|---|
| JP | 2008-70998 A | 3/2008 |
| JP | 2009-234560 A | 10/2009 |
| JP | 2010-271750 A | 12/2010 |
| JP | 2011-242887 A | 12/2011 |
| KR | 10-2010-0058066 A | 6/2010 |
| KR | 10-2011-0054144 A | 5/2011 |

\* cited by examiner

LATERAL CONTROL APPARATUS OF VEHICLE AND CONTROL METHOD OF THE SAME

CROSS-REFERENCE TO RELATED APPLICATIONS

This application is a continuation of application Ser. No. 13/847,008 filed on Mar. 19, 2013, which claims the benefit of Korean Application No. 10-2012-0155703 filed on Dec. 28, 2012 in the Korean Intellectual Property Office, the entire disclosures of which are incorporated herein by reference for all purposes.

TECHNICAL FIELD

The present invention relates to a lateral control apparatus of a vehicle and a lateral control method, and particularly, to a lateral control apparatus of a vehicle and a lateral control method that reflects information on other vehicle which drives in an adjacent lane to perform lane keeping control.

BACKGROUND ART

In an intelligent vehicle control system, a lane keeping assist system (hereinafter, referred to as "LKAS") is a necessary system for safety of a driver. This system is generally configured to detect a lane and senses a driving state of a vehicle to perform lane keeping control without departing from the detected lane or issues a warning of the departure of the lane.

A driving lane or adjacent lanes are detected by obtaining an image of a load ahead the vehicle through a camera sensor which is mounted between a windshield and a room mirror of the vehicle and processing the acquired image of the road by a LKAS camera system.

Generally, the LKAS performs the lane keeping control based on the detected lane. However, if the lane keeping control is performed only based on the detected lane, an accident may be caused by an adjacent vehicle or an obstacle. In order to avoid a crash with the adjacent vehicle or the obstacle, there is a problem in that the lane keeping control may be not performed.

If the lane keeping control is performed only based on the lane, a steering torque is determined in accordance with a location of its own vehicle so that the driving may be unstable due to a sense of difference in steering and the leaning of the vehicle.

Therefore, Korean Patent Application Publication No. 10-2011-0054144 suggests a method that sets a driving trace of its own vehicle to be toward an opposite direction of an adjacent vehicle from a center of the lane and generates a steering torque map to be deflected along the deflected driving trace. However, the method has a problem in that if a plurality of vehicles is present ahead in both lanes, the driving trace of its own vehicle cannot be set to be deflected toward the right or left side. Since the method considers a preceding vehicle which is driving in the adjacent lane, the method cannot cope with a vehicle which approaches at a relatively high speed from the rear side.

Since a lateral offset of the adjacent vehicle which is simply and currently measured is used without predicting a proceeding trace of the adjacent vehicle, if a behavior of the vehicle is changed, it is difficult to precisely perform the lane keeping control.

SUMMARY OF THE INVENTION

The present invention has been made in an effort to provide a lateral control apparatus of a vehicle and a lateral control method which are capable of controlling a lane of a vehicle in consideration of not only a preceding vehicle of an adjacent lane but also a following vehicle.

The present invention has also been made in an effort to provide a lateral control apparatus of a vehicle and a lateral control method which are capable of minimizing a sense of difference of steering or anxiety which a driver may feel.

An exemplary embodiment of the present invention provides a lateral control apparatus of a vehicle, including: an offset measuring unit that measures current lateral offsets of at least two other vehicles at a current time based on a center of a driving lane; a preview offset calculating unit that predicts a lateral offset of other vehicle based on the center of the driving lane based on a location and a speed of the other vehicle at a time when a predetermined time has elapsed to calculate a preview offset; a priority determining unit that determines a priority of the other vehicle based on a difference between the lateral offset and the preview offset; and a controller that generates a route for lane keeping control of its own vehicle based on the lateral offset of the other vehicle to which a top priority determined by the priority determining unit is assigned.

The offset measuring unit may include a first offset measuring unit that measures an lateral offset of at least one of preceding vehicles which is located in a predetermined distance at a front side based on the center of the driving lane, a second offset measuring unit that measures a lateral offset of at least one following vehicle located in a predetermined distance at a rear side.

The preview offset calculating unit may include a measuring unit that measures a longitudinal separation distance and a lateral separation distance between its own vehicle and the other vehicle and measures a longitudinal speed and a lateral speed of the other vehicle, and a calculating unit that calculates a preview offset of the other vehicle after a predetermined time based on the longitudinal separation distance, the lateral separation distance, the longitudinal speed, and the lateral speed measured by the measuring unit.

The measuring unit may include a front camera sensor that obtains an image of a front side of its own vehicle and a rear camera sensor that obtains an image of a rear side of its own vehicle.

The priority determining unit may assign a priority to one of the other vehicles that has a largest difference between the lateral offset and the preview offset.

If a control torque value corresponding to the generated route exceeds a predetermined threshold, the controller may change a speed of its own vehicle to regenerate a route.

Another exemplary embodiment of the present invention provides a lateral control method including: a) a step of measuring lateral offsets of at least two other vehicles at a current time based on a center of a driving lane; b) a step of predicting a lateral offset of other vehicle based on the center of the driving lane based on a location and a speed of the other vehicle at a time when a predetermined time has elapsed to calculate a preview offset; c) a step of determining a priority of the other vehicles based on a difference between the lateral offset and the preview offset; and d) a step of generating a route to perform lane keeping control of its own vehicle based on the lateral offset of the other vehicle to which a top priority is assigned.

In a) step, a lateral offset of at least one preceding vehicle which is located in a predetermined distance at a front side based on a center of the driving lane may be measured and a lateral offset of at least one following vehicle located in a predetermined distance at a rear side based on the center of the driving lane may be measured.

In b) step, a longitudinal separation distance and a lateral separation distance between its own vehicle and the other vehicle may be measured and a longitudinal speed and a lateral speed of the other vehicle may be measured. A preview offset of the other vehicle after a predetermined time has elapsed may be calculated based on the measured longitudinal separation distance, lateral separation distance, longitudinal speed, and lateral speed.

The longitudinal separation distance, the lateral separation distance, the longitudinal speed, and the lateral speed may be measured through images of the front side and the rear side of its own vehicle.

In c) step, a top priority may be assigned to one of the other vehicles that has a largest difference between the lateral offset and the preview offset.

If a control torque value corresponding to the generated route exceeds a predetermined threshold, a speed of its own vehicle may be changed to regenerate a route.

According to a lateral control apparatus and a control lateral control method of the present invention, a current lateral offset of the other vehicle is compared with a preview lateral offset to perform lane keeping control based on the other vehicle to which a top priority is assigned so that a control range of the LKAS extends to remove a sense of difference in steering and anxiety about driving which a driver may feel.

According to a lateral control apparatus and a lateral control method of the present invention, it is advantageous in that a route is generated to perform lane keeping control by considering not only a preceding vehicle in an adjacent lane but also a following vehicle so as to stably perform lane keeping control.

According to a lateral control apparatus and a lateral control method of the present invention, if a control torque value corresponding to the route generated by comparing the current lateral offset of the other vehicle with the preview lateral offset exceeds a predetermined threshold value, a route is reset. Therefore, it is further advantageous to prevent a sense of difference in steering due to a large steering torque from being avoided.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. In the figures, even though the parts are illustrated in different drawings, it should be understood that like reference numbers refer to the same or equivalent parts of the present invention throughout the several figures of the drawing. Hereinafter, exemplary embodiment of the present invention will be described. However, it should be understood that a technical spirit of the invention is not limited to the specific embodiments, but may be changed or modified by those skilled in the art.

Figure 1:
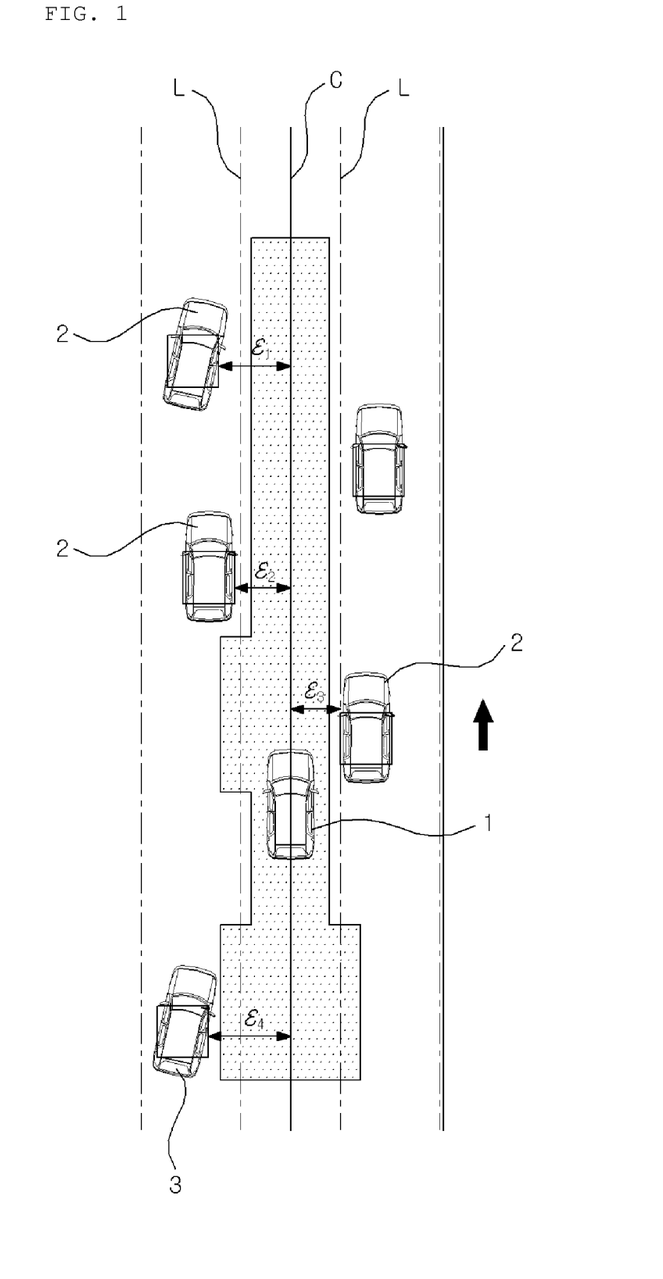
FIG. 1 is a view illustrating a lateral offset of the other vehicle based on a center of a driving lane.

FIG. 1 is a view illustrating a lateral offset of the other vehicle based on a center of a driving lane. Referring to FIG. 1, in LKAS, based on a center C of a driving lane L of an own vehicle 1, lateral offsets $\epsilon 1$, $\epsilon 2$, $\epsilon 3$, and $\epsilon 4$ of other vehicles 2 and 3 which drive in adjacent lanes are used to perform lane keeping control of its own vehicle 1. In this case, the lateral offsets $\epsilon 1$, $\epsilon 2$, $\epsilon 3$, and $\epsilon 4$ indicate a lateral departure distance of the other vehicles 2 and 3 from the center C of the driving lane L. Such a lateral departure distance of the other vehicles 2 and 3 may be measured by a camera sensor which is built in its own vehicle 1.

In the meantime, when a direction indicated by an arrow of FIG. 1 is a driving direction, reference numeral 2 of FIG. 1 denotes other vehicle which precedes its own vehicle 1 and reference numeral 3 of FIG. 1 denotes other vehicle which follows its own vehicle 1.

Figure 2:
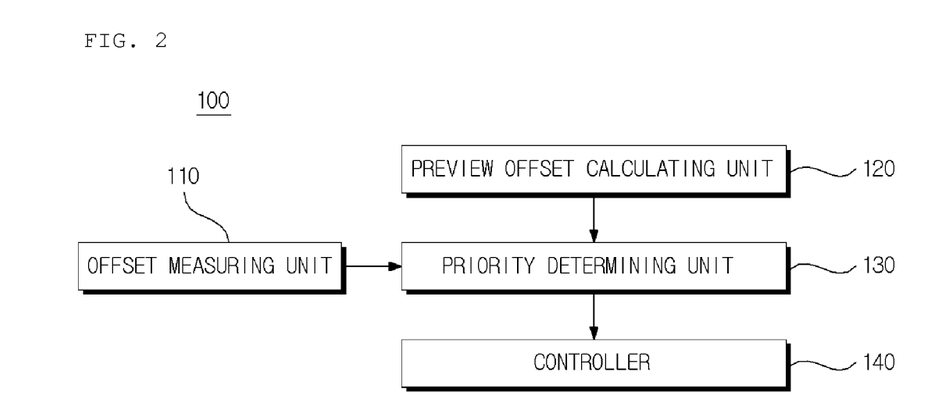
FIG. 2 is a view illustrating a lateral control apparatus according to an exemplary embodiment of the present invention.

FIG. 2 is a view illustrating a lateral control apparatus according to an exemplary embodiment of the present invention.

Referring to FIG. 2, the lateral control apparatus 100 according to an exemplary embodiment of the present invention includes an offset measuring unit 110, a preview offset calculating unit 120, a priority determining unit 130, and a controller 140. The lateral control apparatus 100 may be embodied by one or more processors including or corresponding to the offset measuring unit 110, the preview offset calculating unit 120, the priority determining unit 130 and the controller 140, and operable to execute a computer program to perform the operations described herein.

First, the offset measuring unit 110, as illustrated in FIG. 1, measures lateral offsets $\epsilon_1$, $\epsilon_2$, $\epsilon_3$, and $\epsilon_4$ of other vehicles 2 and 3 which drive in adjacent lanes based on the center C of the driving lane L of its own vehicle 1 at a current point of time.

Figure 3:
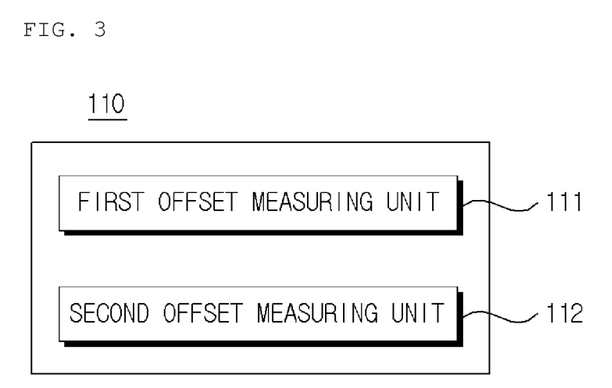
FIG. 3 is a view illustrating an offset measuring unit illustrated in FIG. 2.
Figure 4:
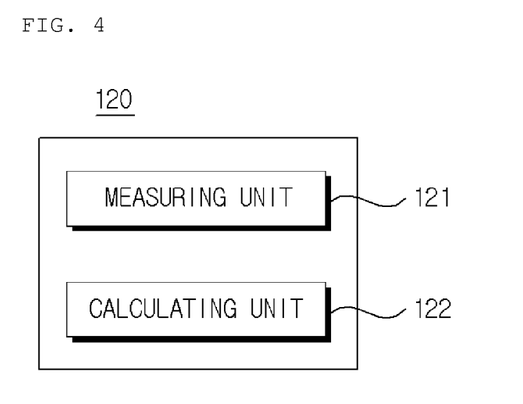
FIG. 4 is a view illustrating a preview offset calculating unit illustrated in FIG. 2.
Figure 5:
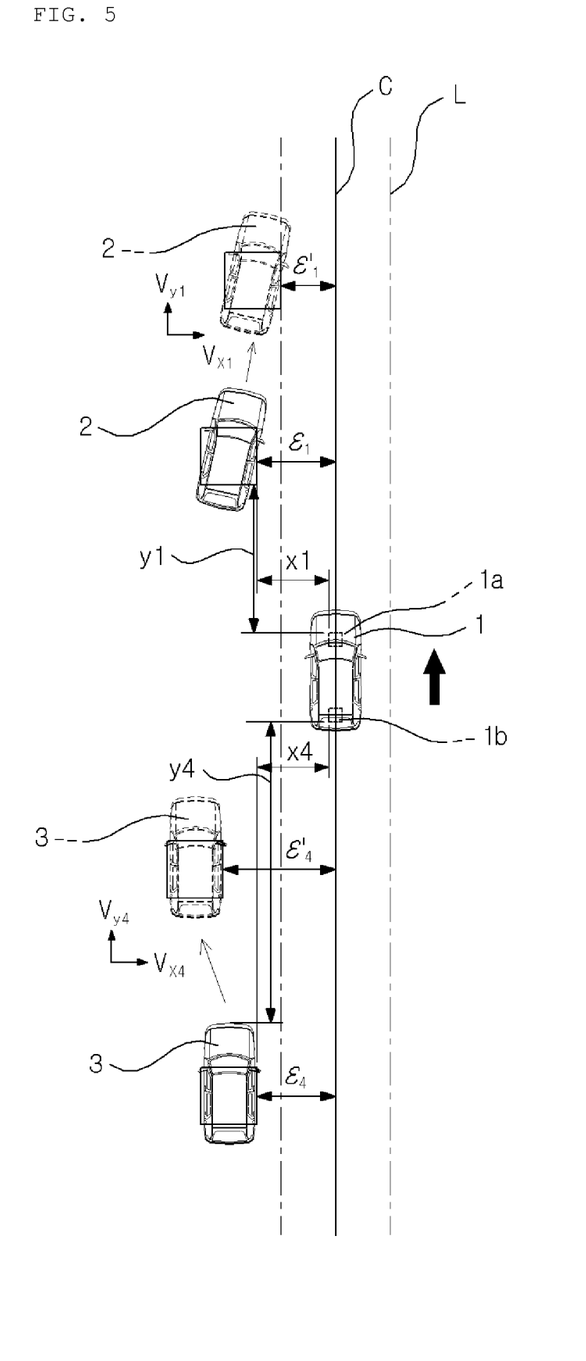
FIG. 5 is a view illustrating a preview offset of the other vehicle based on a center of a driving lane.

FIG. 3 is a view illustrating an offset measuring unit illustrated in FIG. 2, FIG. 4 is a view illustrating a preview offset calculating unit illustrated in FIG. 2, and FIG. 5 is a view illustrating a preview offset of the other vehicle based on a center of a driving lane.

In an exemplary embodiment, referring to FIGS. 1 and 3, the offset measuring unit 110 includes a first offset measuring unit 111 that measures the lateral offsets $\epsilon_1$, $\epsilon_2$, and $\epsilon_3$ of at least one of preceding vehicles 2 which is located in a predetermined distance at a front side of its own vehicle 1. The offset measuring 110 includes a second offset measuring unit 112 that measures a lateral offset $\epsilon_4$ of at least one following other vehicle 2 located in a predetermined distance at a rear side of its own vehicle 1.

Referring to FIG. 5, the first offset measuring unit 111 may be a front camera sensor 1a which is built at a front side of its own vehicle 1 and the second offset measuring unit 112 may be a rear camera sensor 1b which is built at a rear side of its own vehicle 1.

Next, the preview offset calculating unit 120 calculates preview offsets ($\epsilon_1'$ and $\epsilon_4'$ of FIG. 5) of the other vehicles 2 and 3 which drive in the adjacent lanes based on the center C of the driving lane L of its own vehicle 1 at a current point of time. Here, the preview offsets ($\epsilon_1'$ and $\epsilon_4'$ of FIG. 5) indicates lateral offsets of the other vehicles 2 and 3 which are predicted at a time which a predetermined time has elapsed from the current time. In the exemplary embodiment, the preview offset calculating unit 120 includes a measuring unit 121 and a calculating unit 122.

Referring to FIGS. 4 and 5, the measuring unit 121 measures longitudinal separation distances x1 and x4 and lateral separation distances y1 and y4 between its own vehicle 1 and the other vehicles 2 and 3 and measures longitudinal speeds Vx1 and Vx4 and lateral speeds Vy1 and Vy2 of the other vehicles 2 and 3. In the exemplary embodiment, when a direction indicated by an arrow of FIG. 5 is a driving direction, the measuring unit 121 may be a front camera sensor 1a which is built at a front side of its own vehicle 1 and a rear camera sensor 1b which is built at a rear side of its own vehicle 1. The measuring unit 121 measures a longitudinal separation distance x1, a lateral separation distance y1, a longitudinal speed Vx1, and a lateral speed Vy1 of the other preceding vehicle 2 from an image of the front side of its own vehicle 1. The measuring unit 121 measures a longitudinal separation distance x4, a lateral separation distance y4, a longitudinal speed Vx4, and a lateral speeds Vy4 of the other following vehicle 4 from an image of the rear side of its own vehicle 1.

The calculating unit 122 predicts and calculates lateral offsets (preview offsets $\epsilon_1'$ and $\epsilon_4'$) of the other vehicles 2 and 3 at a time when a predetermined time has elapsed from the current time based on the longitudinal separation distances x1 and x4, the lateral separation distances y1 and y4, the longitudinal speeds Vx1 and Vx4, and the lateral speeds Vy1 and Vy measured by the measuring unit 121.

Next, the priority determining unit 130 determines a priority from a view point of the lane keeping control based on a difference $\epsilon_n - \epsilon_n'$ between the lateral offset at the current time measured by the offset measuring unit 110 and a preview offset at a future time calculated by the preview offset calculating unit 120. In an exemplary embodiment, the priority determining unit 130 may assign a top priority to the other vehicle which has the largest difference $\epsilon_n - \epsilon_n'$ between the lateral offset at the current time and a preview offset at a future time among a plurality of other vehicles. For example, if $\epsilon_1 - \epsilon_1'$ has the largest value among $\epsilon_1 - \epsilon_1'$, $\epsilon_2 - \epsilon_2'$, $\epsilon_3 - \epsilon_3'$ and $\epsilon_4 - \epsilon_4'$, as illustrated in FIG. 5, the lane keeping control is performed based on the lateral offset $\epsilon_1$ of the other vehicle 2 which precedes its own vehicle 1. This is because the other vehicle to which the top priority is assigned means a vehicle which closely approaches its own vehicle 1 at the highest speed for a predetermined time. Therefore, the other vehicle has the highest risk of crashing with its own vehicle 1 so that the lane keeping control needs to be performed to prevent the crash. If the difference $\epsilon_n - \epsilon_n'$ between the lateral offset and the preview offset is a negative value, the corresponding other vehicle is predicted as a vehicle which moves far from its own vehicle 1 so that the vehicle may be removed from a target of the lane keeping control.

In the meantime, in the description of the lateral control apparatus 100 of the exemplary embodiment of the present invention, it is described that the priority determining 130 determines other vehicle which has a largest difference $\epsilon_n - \epsilon_n'$ between the lateral offset at the current time and the preview offset at a future time as a vehicle having a top priority. However, the present invention is not limited thereto, but a priority of the other vehicles which becomes a target of the lane keeping control may be determined by various methods.

The controller 140 generates a route for lane keeping control of its own vehicle 1 based on the lateral offset of the other vehicle determined to have a top priority in the priority determining unit 130. In this case, if a control torque value for steering calculated so as to correspond to the generated route exceeds a predetermined threshold value, a route is regenerated by increasing or decreasing a speed of its own vehicle 1, in order to prevent a sense of difference in steering caused by the large control torque value.

Figure 6:
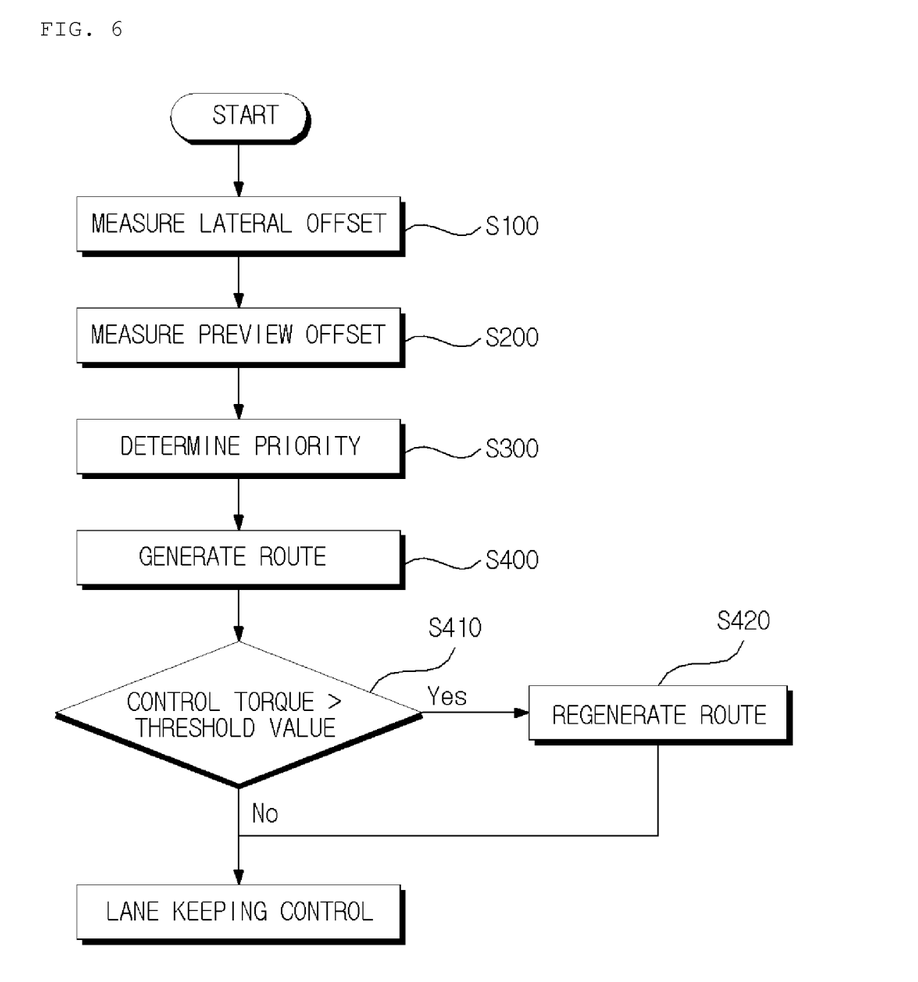
FIG. 6 is a flowchart illustrating a lateral control method according to an exemplary embodiment of the present invention.

FIG. 6 is a flowchart illustrating a lateral control method according to an exemplary embodiment of the present invention.

Referring to FIGS. 1 to 6, the lateral control apparatus 100 according to an exemplary embodiment measures lateral offsets of at least two other vehicles 2 and 3 at a current time based on the center C of the driving lane (S100). In this case, a lateral offset of at least one preceding vehicle 2 which is located in a predetermined distance at a front side from the center C of the driving lane and a lateral offset of at least one following vehicle 3 which is located in a predetermined distance at a rear side from the center C of the driving lane.

Next, the lateral control apparatus 100 predicts a lateral offset of the other vehicle based on the center C of the driving lane at a time when a predetermined time has elapsed based on the location and a speed of the other vehicles 2 and 3 to calculate a preview offset. In this case, the lateral control apparatus 100 measures longitudinal separation distances X1 and X4 and lateral separation distances y1 and y4 between its own vehicle 1 and other vehicles 2 and 3 and also measures longitudinal speeds Vx1 and Vx4 and lateral speeds Vy1 and Vy4 of the other vehicles 2 and 3.

Next, the lateral control apparatus 100 determines a priority of the other vehicles 2 and 3 based on a difference $\epsilon_n - \epsilon_n'$ between the lateral offset and the preview offset (S300). In this case, a top priority is assigned to a largest difference of the differences $\epsilon_n - \epsilon_n'$ between the lateral offset and the preview offset.

Next, the lateral control apparatus 100 generates a route for the lane keeping control of its own vehicle 1 based on lateral offsets $\epsilon_1$, $\epsilon_2$, $\epsilon_3$, and $\epsilon_4$ of the other vehicles 2 and 3 to which the top priority is assigned (S400). In this case, it is determined whether a control torque value corresponding to the generated route exceeds a threshold value (S410). If the control torque value exceeds the threshold value, the lateral control apparatus changes the speed of its own vehicle 1 to regenerate a route (S420).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A vehicle control system, comprising:
a camera mountable in a second object; and
at least one processor operatively connected to the camera, the at least one processor being configured to
capture from the camera, in real time, image frames from respective images of a first object within a field of view of the camera,
measure a lateral offset and a longitudinal offset of the first object, wherein the first object is disposed in a lane adjacent to a driving lane of the second object at a first time, and wherein the measured lateral offset indicates a distance from the first object to the driving lane at the first time and the measured longitudinal offset indicates a distance from the second object to the first object at the first time,
predict a preview lateral offset and a preview longitudinal offset of the first object based on either one or both of a location and a speed of the first object, wherein the preview lateral offset indicates a predicted distance from the first object to the driving lane at a second time when a predetermined time has elapsed from the first time and the preview longitudinal offset indicates a predicted distance from the second object to the first object at the second time,
determine a priority of the first object with respect to other objects as a function of the measurement and the prediction, wherein the priority is based on a risk of the first object colliding with the second object by entering the driving lane, and
control the second object based on the priority.

2. The vehicle control system of claim 1, wherein the at least one processor is further configured to determine priorities of additional objects based on:
measurement of a lateral offset and longitudinal offset of the additional objects; and
prediction of either one or both of a preview lateral offset and preview longitudinal offset of the additional objects.

3. The vehicle control system of claim 2, wherein the control of the second object comprises control of either one or both of a speed and a steering of the second object.

4. A vehicle control system, comprising:
a camera mountable in a vehicle; and
at least one processor operatively connected to the camera, the at least one processor being configured to
capture from the camera, in real time, image frames from respective images of objects within a field of view of the camera,
measure a first position of the objects on a road at a first time, wherein the objects are disposed in a lane of the road adjacent to a driving lane of the vehicle at the first time, and wherein the first position is determined by a longitudinal offset and a lateral offset of the objects obtained by the camera,
predict a second position of the objects on the road at a second time when a predetermined time has elapsed from the first time, wherein the second position is determined by a predicted longitudinal offset and a predicted lateral offset of the objects,
determine priorities of the objects as a function of the measurement and the prediction, wherein the priorities are based on risks of the objects colliding with the vehicle by entering the driving lane, and
control the vehicle based on the priorities.

5. The vehicle control system of claim 4, wherein the at least one processor is further configured to determine the priorities based on a difference between the lateral offset obtained by the camera and the preview lateral offset.

6. The vehicle control system of claim 5, wherein the at least one processor is further configured to assign a top priority, among the priorities, to an object, among the objects that has a largest difference between the lateral offset obtained by the camera and the preview lateral offset.

7. The vehicle control system of claim 4, wherein the control of the vehicle comprises generation of a route within a driving lane and control of a speed of the vehicle based on the priorities.

8. The vehicle control system of claim 7, wherein the control of the vehicle comprises calculation of a control torque value corresponding to the route.

9. The vehicle control system of claim 4, wherein:
the control of the vehicle comprises
generation of a first route within a driving lane based on the determination of the priorities, and
in response to a control torque value corresponding to the first route exceeding a predetermined threshold, generation of a second route within the driving lane; and
a control torque value corresponding to the second route is smaller than the predetermined threshold.

10. The vehicle control system of claim 9, wherein the at least one processor is further configured to generate the second route by changing a speed of the vehicle.

11. A method of controlling a vehicle, the method comprising:
capturing, in real time, from a camera included in a vehicle control system and operatively connected to at least one processor, image frames from respective images of objects within a field of view of the camera;
measuring, using the at least one processor, a first position of the objects on a road at a first time, wherein the objects are disposed in a lane of the road adjacent to a driving lane of the vehicle at the first time, and wherein the first position is determined by a longitudinal offset and a lateral offset of the objects obtained by the camera;
predicting, using the at least one processor, a second position of the objects on the road at a second time when a predetermined time has elapsed from the first time, wherein the second position is determined by a predicted longitudinal offset and a predicted lateral offset of the objects;
determining, using the at least one processor, priorities of the objects as a function of the measurement and the prediction, wherein the priorities are based on risks of the objects colliding with the vehicle by entering the driving lane; and
controlling, using the at least one processor, the vehicle based on the priorities.

12. The method of claim 11, wherein the controlling of the vehicle comprises generating a route within a driving lane and controlling a speed of the vehicle based on the priorities.

13. The method of claim 12, wherein the controlling of the vehicle further comprises calculating a control torque value corresponding to the route.

14. The method of claim 11, wherein the controlling of the vehicle comprises:
   generating a first route within a driving lane based on the determining of the priorities; and
   in response to a control torque value corresponding to the first route exceeding a predetermined threshold, generating a second route within the driving lane, wherein a control torque value corresponding to the second route is smaller than the predetermined threshold.

15. The method of claim 14, further comprising generating the second route by changing a speed of the vehicle.

* * * * *